United States Patent [19]
Rankins

[11] 3,778,987
[45] Dec. 18, 1973

[54] WINDROW RAKE OPENING DEVICE AND ONE WHEEL TRACTOR

[76] Inventor: Everett V. Rankins, P.O. Box 132, Manteca, Calif. 95336

[22] Filed: May 18, 1972

[21] Appl. No.: 254,730

Related U.S. Application Data

[63] Continuation-in-part of Ser. No. 51,597, July 1, 1970, Pat. No. 3,672,459.

[52] U.S. Cl. ............................... 56/377
[51] Int. Cl. ........................... A01d 77/06
[58] Field of Search ............... 56/365, 366, 367, 56/377, 333, 334, 10.6

[56] References Cited
UNITED STATES PATENTS

| | | | |
|---|---|---|---|
| 2,602,280 | 7/1952 | Crowe et al. | 56/377 |
| 2,635,411 | 4/1953 | Hicks | 56/377 |
| 2,683,345 | 7/1954 | Meyer | 56/377 |
| 2,893,192 | 7/1959 | Tallman | 56/10.6 |
| 3,145,522 | 8/1964 | Zink | 56/377 |
| 3,390,516 | 7/1968 | Burrows | 56/400.19 |
| 3,483,689 | 12/1969 | Kabel | 56/400.19 |

*Primary Examiner*—Russell R. Kinsey
*Attorney*—Julian Caplan

[57] ABSTRACT

A windrow rake has two rake wheel mounting members pivotted relative to each other and to a longitudinal beam so that by hydraulic controls operable from the towing vehicle the members can be moved between a transport position in which the members are parallel and close to the beam and a working position in which the members diverge outwardly forwardly. Ground wheels for the members are hydraulically turned automatically so that the wheels rotate in planes parallel to the direction of movement. The beam may be towed by a conventional tractor or by a one-wheel self-propelling attachment shown in copending U.S. application Ser. No. 51,597 filed July 1, 1970 which is now U.S. Pat. No. 3,672,459. Auxiliary retractable wheels may be mounted on said attachment to support it in upright position where not connected to the rake or other implement.

8 Claims, 7 Drawing Figures

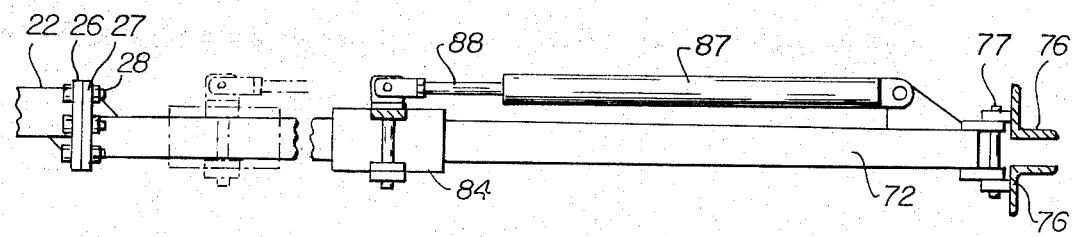
Fig. 5
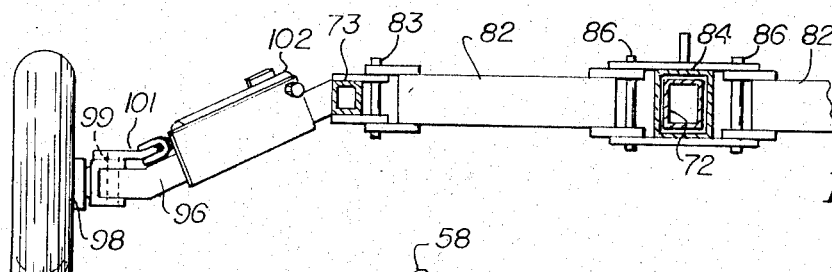
Fig. 6
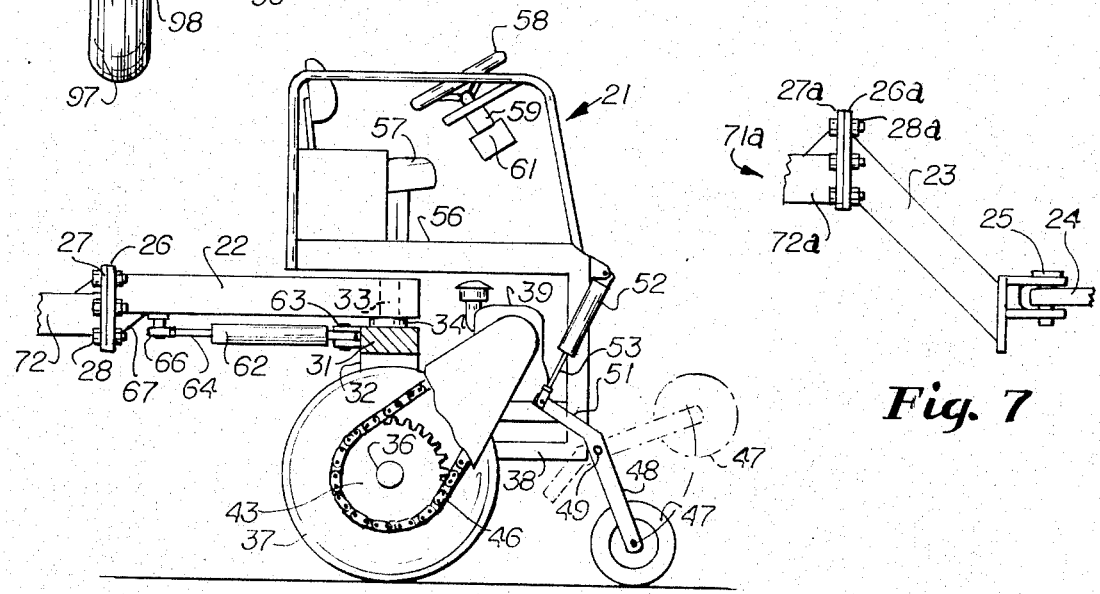
Fig. 2
Fig. 7
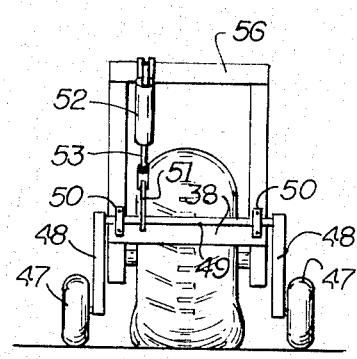
Fig. 1

WINDROW RAKE OPENING DEVICE AND ONE WHEEL TRACTOR

This application is a continuation-in-part of copending application Ser. No. 51,597 filed July 1, 1970 which is now U.S. Pat. No. 3,672,459.

This invention relates to a windrow rake opening device wherein a longitudinal horizontal beam is towed by a tractor and a pair of arms are pivotally mounted relative to each other and to the beam at the rear of the beam. Conventional windrow rake wheels are mounted on the arms. In operative position, the arms diverge outwardly forwardly from the rear of the beam. However, when it is necessary to move the rake over highways or at other times when it is desirable to collapse the members, the members can be moved to a transport position wherein the members and beam are substantially parallel.

The present invention also relates to a one-wheel tractor of the type shown in copending application Ser. No. 51,597 wherein there is provided a pair of auxiliary wheels which are normally retracted but which can be let down to ground contact by hydraulic means when the one-wheel tractor is disconnected from an implement. The auxiliary wheels stabilize the tractor so that it remains in upright position even though it is not connected to an implement.

A principal feature of the present invention is the fact that the rake is movable betweeen working position and transport position by hydraulic means under the control of the operator. Preferably, the controls for the hydraulic means are located on or adjacent the front of the beam where they can be reached by the operator of the tractor without the necessity of dismounting from the operator's seat.

Another feature of the invention is the fact that the members which support the rake wheels are themselves supported by ground engaging wheels. Hydraulic means is provided to insure that the plane of rotation of the ground engaging wheels is parallel to the direction of movement whether the members are in working or in transport position.

The advantages of the single-wheel self-propelling attachment of Ser No. 51,597 apply equally to the present invention. Thus, for example, the attachment may be mounted on a single wheel as distinguished from the conventional three of four wheels used in a tractor with resulting less tamping of the crop and less wear on the tires.

Further, the attachment is relatively short as distinguished from conventional tractors and this achieves a shorter turning radius for the implement.

Another feature of the invention is the fact that the driver, prime mover and the ground engaging wheel turn as a unit. This eliminates complicated drive shafts used in other self-propelling units. The fact that the driver is mounted on the propelling unit and preferably on the top of same provides for better visibility both ahead and also to observe the operation of the implement being drawn. The driver is above the ground a considerable distance and dust is not as great a problem as would otherwise be the case.

A principal feature of the invention is the economy of the device. The necessity of having a separate tractor for the implement is eliminated and the need to truck the implement to a remote field when it is moved from field to field is eliminated. The device has a relatively high road speed as compared with conventional farm tractors and is considerably faster than self-propelled equipment.

Another feature of the invention is the fact that a wide, low-pressured tire is used to support the unit which provides a smooth ride without the necessity of using springs and also provides good traction because of the unusual width of the tires.

A still further feature of the invention is the provision of auxiliary wheels which can be let down to ground contact at the control of the operator to support the tractor in upright position even when it is not connected to an implement. This feature of the invention makes it unnecessary to brace the tractor when it is disconnected from an actual implement and also makes it possible to drive the tractor even when it is not connected.

Other objects of the present invention will become apparent upon reading the following specification and referring to the accompanying drawings in which similar characters of reference represent corresponding parts in each of the several views.

In the drawings:

FIG. 1 is a front elevation view partly broken away to reveal internal construction of the one-wheel tractor of the present invention.

FIG. 2 is a side elevation thereof with portions broken away.

FIG. 5 is a fragmentary sectional view taken substantially along the line 5—5 of FIG. 4.

FIG. 6 is a fragmentary sectional view taken substantially along the line 6—6 of FIG. 4.

FIG. 7 is a fragmentary side elevational view showing an alternate means of drawing the rake by means of the towbar of a conventional tractor.

Figure 3:
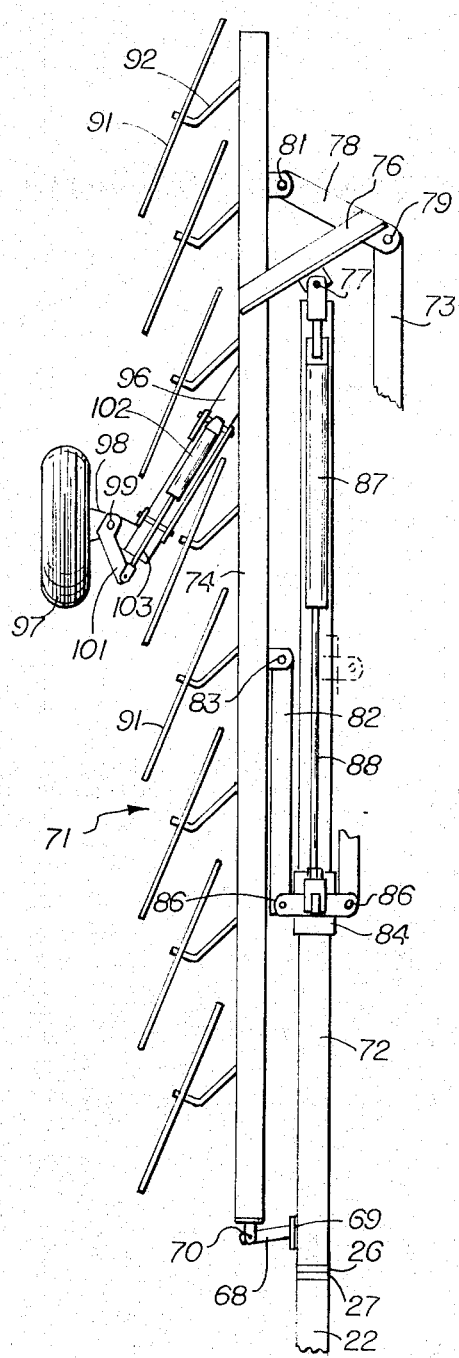
FIG. 3 is a top plan of the rake portion of the invention showing the right wheel supporting member collapsed in transport position.

In the accompanying drawings the unit is shown attached to a rake 71. It will be understood that the implement shown is representative of the different types of farm implements to which the tractor may be connected. In customary practice, the unit 71 is towed by means of a conventional tractor, but the present invention provides a substitute for such tractor.

The self-propelling unit 21 is attached to implement 71 by means of tongue 22 which has a vertical flange 26 connected to flange 27 on the forward end of beam 72 of rake 71. It will be understood that the flange 27 may be a portion of any other implement. The flanges 26, 27 are bolted together by bolts 28 if the unit 21 is intended to be detachable. It will be understood that the illustrated precise attachment of tongue 22 to implement 71 is subject to certain modifications depending upon the construction of such unit. However, in general, the attachment is such that the tongue 22 becomes a rigid forward projection of the implement and is semi-permanent in nature. When necessary, bolts 28 may be removed so that the tongue 22 may be attached to other implements.

Unit 21 has a heavy, rigid U-shaped frame having a top frame member 31 extending horizontally almost the entire width of the unit and from which depend vertical sides 32 or legs. A vertical pivot member 33 extends through the forward end of tongue 22 and is received in a bearing 34 on the top of member 31. Thus, the tongue 22 may turn relative to member 31, 32.

Extending transversely between the lower ends of legs 32 is a horizontal axle 36 on which is mounted a wheel having a low pressure, extremely wide tire 37 provided with traction grips. Tire 37 is commercially available for farm implements and is sold under the name "Terra Tire." Mounted forwardly of top member 31 is a prime mover support 38 extending transversely of the unit and supporting thereon a prime mover 39 which may be a gasoline or diesel driven engine. The engine 39 may be connected directly or indirectly to a sprocket pinion, not shown, which drives a sprocket 43 on axle 36 by means of chain 46.

A platform 56 is mounted above frame member 31 and affixed thereto and the driver's seat 57 is supported above platform 56. Thus the operator is above the dust created by operation of the pulling unit and the implement being propelled and has good visibility forwardly and also to observe the operation of the implement. The operator turns wheel 58 of steering shaft 59 and said shaft carries hydraulic steering valve 61 of the type used in power steering apparatus for other vehicles.

Steering of the unit is accomplished by means of a cylinder 62 which is horizontally rearwardly disposed and is pivotally connected to member 31 by pivot mounting 63. The rod 64 of cylinder 62 is pivotally connected by means of mounting 66 to a bracket 67 fixed to the rear of tongue 22. When the operator turns wheel 58, valve 61 controls the pumping of hydraulic fluid to opposite ends of cylinder 62 to project and retract rod 64 and thereby steer the unit 21 relative to implement 71. Because of the mounting of tongue 22 centrally above member 31, unit 21 may be turned to an angle of about 60° to either side, making a tight steering radius feasible.

When unit 21 is connected to implement 71 in a semi-permanent fashion, the unit is readily propelled over the ground with the advantages heretofore stated. When implement 71 is to be replaced or when the season has changed so that the unit 21 may be used with another implement, the bolts 28 or other fastening means are removed and the entire unit 21 may be used to pull another implement.

The present invention provides support for the unit 21 when it is disconnected from unit 71. Auxiliary wheels 47 are mounted on the lower ends of arms 48 which are pivoted to transverse horizontal axle 49 which is supported on support 38 by means of pillow blocks 50 or other convenient means. Arm 51 is also affixed to axle 49 and is pivotally connected to the rod 53 of the hydraulic cylinder 52. By the operator energizing cylinder 52, in opposite directions, the arm 51 may be pivoted about axle 49 and this in turn raises and lowers the wheels 47. When the wheels 47 are in ground contact, they provide a stabilizing support for the unit 21 so that it does not tip even when its flange 26 is not connected to another member.

In FIG. 7 an alternate means of attachment of an implement 71a is shown. The drawbar 72a or other portion thereof is formed with a vertical flange 27a which is bolted by means of bolts 28a to a matching vertical flange 26a of downwardly-forwardly slanted connector bar 23. The forward end of bar 23 is connected to the tow bar 24 of a conventional tractor by means of vertical axis pivot 25 passing through suitable apertures in members 23 and 24. The implement 21a may be of a wide variety of types such as a baler, an orchard spray rig, or other apparatus.

Figure 4:
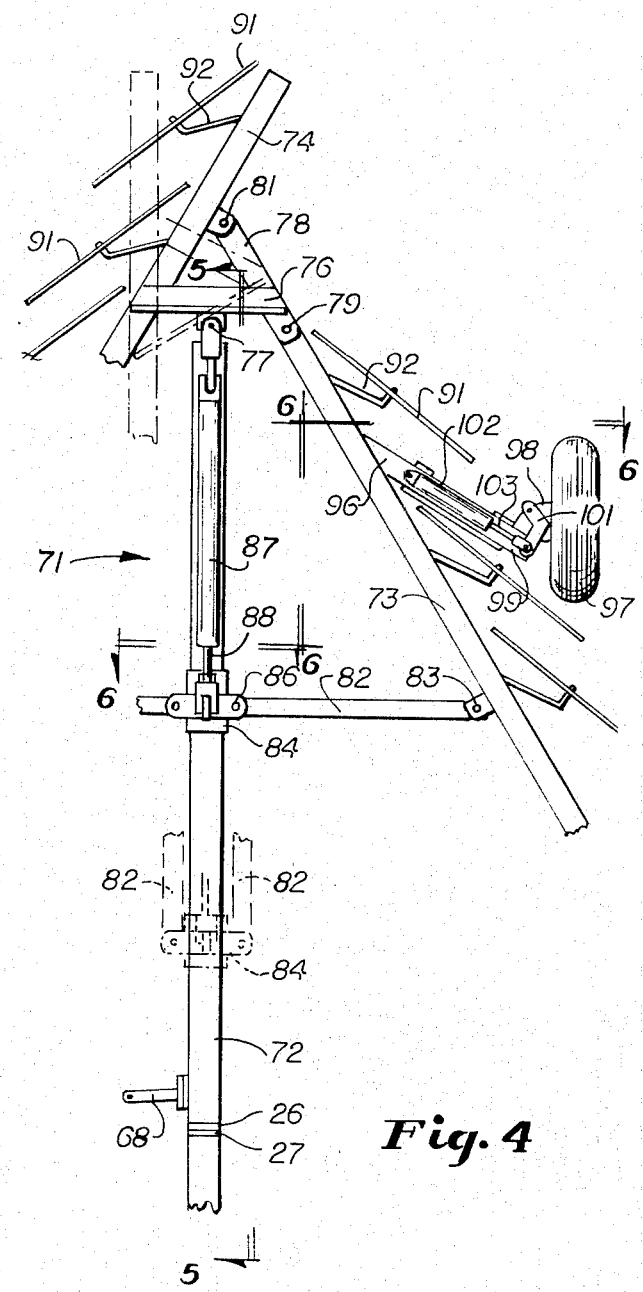
FIG. 4 is a view similar to FIG. 3 showing the members in outward diverging working position.

The particular implement shown in FIGS. 3-6 is a rake 71. Such rake has a horizontal, longitudinal beam 72 extending substantially its entire length and left and right horizontal members 73, 74 respectively articulately connected thereto. In the towing position shown in FIG. 3, members 73, 74 are parallel and in close proximity to beam 72. In FIG. 4, the members 73, 74 diverge outwardly forwardly relative to beam 72 at an angle well understood in the raking art to rake a suitable windrow.

To provide that the rake covers the entire area when it is in working position, the members 73, 74 overlap at the rear. For such purpose, horizontal members 76 are fixed adjacent the rearward end of member 74 and are disposed at an angle best shown in FIG. 3. Arm 76 is pivoted to the rear end of beam 72 by means of pivot 77. A horizontal link 78 is fixed to the outer end of arm 76 and one end thereof is pivoted by means of vertical pivot 79 to the rear end of member 73 while the other end of link 78 is pivoted by means of vertical pivot 81 to member 74 adjacent but spaced forwardly of the rear end thereof.

To move members 73, 74, horizontal expansion arms 82 are provided on either side of the machine. The outer end of each arm 82 is pivotally connected by means of vertical axis connection 83 to approximately the midpoint of member 73 or 74. Slidable longitudinally of beam 72 is a collar 84 and the inner ends of expansion arms 82 are pivotally connected to collar 84 by vertical axis connections 86. Mounted longitudinally on beam 72 is cylinder 87, the rod 88 of which is pivotally connected to collar 84. When the rod 88 is extended as viewed in FIG. 3, the collar 84 is moved forwardly and this pulls members 73, 74 inward toward beam 72 so that they are parallel. When the rod 88 is retracted as in FIG. 4, the rearward pulling of collar 84 causes the arms 82 to assume a position perpendicular to beam 72 and thus to cause the member 73, 74 to diverge to working position. As a safety precaution, latch 68 may be provided. Latch 68 is pivoted about horizontal longitudinal pivot 69 fixed to the forward end of beam 72 and its outer end engages eye 70 on the forward end of one of the members 73, 74. The latch 68 is preferably located close enough to the tractor so that it may be disengaged by the operator without leaving the operator's seat.

A plurality of rake wheels 91 having tines are mounted on members 73, 74 by arms 92 in a well-known manner and are hydraulically controlled by hydraulic means (not shown) so that they are raised and lowered. When lowered, the tines rake hay into windrows as is well understood in this art. Preferably the control for raising and lowering the wheels 91 is adjacent the control for cylinder 87.

Extending forwardly downwardly from a position adjacent but spaced forwardly of the rear of each of members 73, 74 is a wheel support 96 which supports a wheel 97 which engages the ground. Wheel 97 has an axle which is received in an axle support 98 mounted by means of vertical pivot 99 to the lower end of wheel support 96. Link 101 is fixed to support 98 to turn the same and link 101 is controlled by a hydraulic cylinder 102 mounted on each wheel support 96 having a downwardly extending rod 103 pivotally connected to the link 101.

By means well understood in the hydraulic control art and forming no part of the present invention, cylinders 102 and 87 are connected so that when the rod 88 is projected to the position shown in FIG. 3, the same hydraulic pressure which causes extension of rod 88 also causes extension of rod 102. On the other hand, when the controls for cylinder 87 are reversed so that rod 88 is retracted to the position shown in FIG. 4, rod 103 is similarly retracted. Thus, regardless of the angle assumed by members 73, 74 relative to beam 72, the plane of rotation of wheels 97 is parallel to the beam 72 or, in other words, to the direction of movement of the rake.

In operation, assuming that the rake is in the position of FIG. 3 for transport to the field, the rake wheels 91 are elevated. Upon arrival at the site, the operator unlatches latch 68 and energizes cylinder 87 to retract the rod 88 and also moves the implement 71 forwardly (down as viewed in FIGS. 3 and 4). Energization of cylinder 87 to retract rod 88 pulls the collar 84 rearwardly along beam 72 and causes the expansion arms 82 to diverge, thereby forcing the members 73, 74 to outward-forward diverging position. As best shown in FIG. 4, the rearward end of member 74 overlaps members 73 by reason of the positioning of arm 76 and link 78. The same energization of cylinder 87 energizes the two cylinders 102 to swing the wheels 97 to forward position. Thereupon, the rake wheels 71 are depressed and the implement is ready to rake windrows.

What is claimed is:

1. A frame for mounting rake wheels of the character described comprising a longitudinally extending beam, a first and a second horizontal rake wheel support member, means articulately connecting said beam and members together adjacent the rearward end of said beam for movement between a transport position with said beam and members all substantially parallel and in close proximity to each other and a working position with said members diverging outwardly forwardly on opposite sides of said beam, a pair of expansion arms each pivotally connected to one of said members, expansion means movable on said beam and connected to said arms for spreading said arms out from said beam, and hydraulic means for actuating said expansion means.

2. A frame according to claim 1 in which said expansion means comprises a crosshead slidable relative to said beam and reciprocated along said beam by said hydraulic means and in which said expansion arms are pivoted to said crosshead.

3. A frame according to claim 2 in which said crosshead comprises a collar fitting around said beam and slidable longitudinally of said beam.

4. A frame according to claim 1 which further comprises a rearwardly-inwardly directed arm fixed to said first member, the rear of said beam pivotally connected to the midpoint of said arm, a link fixed to the end of said arm, and means pivotally connecting each end of said link to said members.

5. A frame according to claim 1 which further comprises for each said member a wheel support extending outwardly downwardly from said member, a wheel having an axle, means mounting said axle to said support for pivotal movement about a vertical axis, a link fixed to turn said wheel about said axis and second hydraulic means between said support and link to pivot said wheel.

6. A frame according to claim 5 in which said first and second hydraulic means are adapted to be interconnected whereby as said members diverge said wheel is pivoted to maintain a position parallel to said beam.

7. In combination, a frame according to claim 1, a tongue attached to the forward end of said beam, an inverted U-shaped tractor frame, means pivotally mounting the forward end of said tongue to the middle of said tractor frame about a vertical axis, steering means for pivotting said tractor frame relative to said tongue, an axle rotatable in said tractor frame, a wheel having an enlarged tire on said axle, a prime mover support on said tractor frame and pivotal therewith, a prime mover on said prime mover support, means connecting said prime mover to drive said axle.

8. The combination of claim 7 in which said tongue is detachable from said beam and which further comprises at least one auxiliary wheel, a wheel support arm on which said auxiliary wheel is mounted, means pivotally mounting said wheel support arm on said tractor frame, and means for moving said wheel support arm from a retracted position to a ground engaging position to stabilize said tractor frame when said tongue is disconnected from said beam.

\* \* \* \* \*